(12) United States Patent
Garro et al.

(10) Patent No.: US 6,372,071 B1
(45) Date of Patent: Apr. 16, 2002

(54) ARTICLE COMPRISING AT LEAST ONE METAL WIRE EMBEDDED IN A VULCANIZED ELASTOMERIC MATERIAL

(75) Inventors: Luciano Garro; Enzo Falzolgher, both of Milan (IT)

(73) Assignee: Pirelli Coordinamento Pneumatici S.p.A., Milan (IT)

( * ) Notice: Subject to any disclaimer, the term of this patent is extended or adjusted under 35 U.S.C. 154(b) by 0 days.

(21) Appl. No.: 08/250,617

(22) Filed: May 27, 1994

Related U.S. Application Data

(62) Division of application No. 07/813,390, filed on Dec. 27, 1991, now Pat. No. 5,356,711.

(30) Foreign Application Priority Data

Dec. 27, 1990 (IT) ............................................. 22547/90

(51) Int. Cl.[7] ............................... B60G 9/00; B05D 3/00
(52) U.S. Cl. ..................................... 156/124; 427/388.2
(58) Field of Search ................................. 525/348, 350; 156/124; 427/388.2

(56) References Cited

U.S. PATENT DOCUMENTS

| | | | | |
|---|---|---|---|---|
| 2,135,886 A | * | 11/1938 | Elder | 428/465 |
| 2,435,191 A | * | 2/1948 | Adler | 428/465 |
| 2,939,207 A | * | 6/1960 | Adler | 428/465 |
| 3,897,583 A | * | 7/1975 | Bellamy | 428/465 |
| 4,255,496 A | * | 3/1981 | Haemers | 428/465 |
| 4,258,770 A | | 3/1981 | Davis et al. | |
| 4,376,838 A | * | 3/1983 | Davis | 524/184 |
| 4,452,291 A | * | 6/1984 | Shemenski et al. | 428/465 |
| 4,719,266 A | * | 1/1988 | Craig | 428/465 |
| 4,851,469 A | | 7/1989 | Saitoh | |
| 4,992,314 A | | 2/1991 | Saitoh | |
| 5,200,273 A | * | 4/1993 | Muraoka | 428/465 |

FOREIGN PATENT DOCUMENTS

| | | | | |
|---|---|---|---|---|
| JP | 132238 | * | 5/1981 | 428/465 |
| JP | 088476 | * | 7/1981 | |
| JP | 5770138 | | 4/1982 | |
| JP | 184498 | * | 4/1984 | 428/465 |
| JP | 62201949 | | 9/1987 | |
| JP | 3182339 | * | 8/1991 | 428/465 |
| US | EP0141133 | * | 5/1985 | 428/465 |

OTHER PUBLICATIONS

Eccher et al *Improvement of the Testing Method for Adhesion of Vulcanized Rubber to Steel Wire Cords,* "Kautschuk Und Gummi Kunststoffe", vol. 5, (1969), pp. 228–232.

Kautschuk und Gummi—Kunststoffe, vol. 37, No. 6, Jun. 1984 Heidelberg DE, pp. 493–496; J. R. Davies: "Verbesserte Adhäsion von Kautschuk an verzinktem Stahlcord für Fürderbänder".

* cited by examiner

*Primary Examiner*—Christopher Henderson
(74) *Attorney, Agent, or Firm*—Stevens, Davis, Miller & Mosher, LLP

(57) ABSTRACT

At least one metal wire embedded in a vulcanized elastomeric matrix obtained from a mixture comprising at least one vulcanizable elastomer and at least one vulcanization agent such as sulfur. The metal wire is galvanized steel and the vulcanizable mixture contains at least 0.2% by weight of trimercapto triazine, with respect to the weight of said elastomer, and 0.1–0.5% by weight of cobalt, with respect to the weight of said elastomer.

5 Claims, 3 Drawing Sheets

ARTICLE COMPRISING AT LEAST ONE METAL WIRE EMBEDDED IN A VULCANIZED ELASTOMERIC MATERIAL

This is a DIVISION of application Ser. No. 07/813,390, filed Dec. 27, 1991 now U.S. Pat. No. 5,356,711.

FIELD OF THE INVENTION

The present invention relates to an article comprising at least one metal wire embedded in a vulcanized elastomeric material. More particularly, the present invention relates to the elastomer/metal connection in an article comprising at least one metal wire coated with a vulcanized elastomeric matrix.

BACKGROUND OF THE INVENTION

It is known that structures of this type are used frequently in articles such as tires, conveyor belts, transmission belts, flexible hose, etc.

In such articles, the metal wires, possibly in the form of cords, must, at one and the same time, have adequate mechanical features, good resistance to corrosion and a good adhesion to the elastomeric material.

Steel, the material of choice with respect to mechanical features, has the disadvantage of adhering insufficiently to the vulcanized elastomeric material. In order to obtain a high level of adhesion to the vulcanized elastomeric material it is thus necessary to coat the steel with suitable materials.

For instance, it is known that it is possible to obtain good adhesion with steel wires coated with a layer of brass made up of about 70% of copper and 30% of zinc. In this case the connection is promoted by the formation of a thin layer of copper sulphide, by the sulfur itself or by its known derivatives present, as vulcanizing agents, in the vulcanization mixture.

Adhesion failure between brass coated steel and elastomer occurs in the presence of humidity and oxygen. Decay can be reduced in part by adding some cobalt in the form of a salt. In this case it is believed that cobalt reduces the electrical conductivity of the layer of copper sulphide, slowing the rate of diffusion of the Zn++ ions, as a consequence, the interface layer $ZnO/Zn(OH)_2$ responsible for the destruction of the $Cu_xS$ film is reduced. As a result, improvement in adhesion is obtained.

While the condition of ensuring a connection that is good and stable in time is, on the whole, satisfied, brass-coated steel is only slightly resistant to corrosion.

In the articles of vulcanized elastomeric material reinforced with brass-coated steel wires, possibly in the form of cords, such as tires, corrosion is induced both by humidity which permeates the elastomer and by water which manages to come into contact with the brass-coated steel reinforcing structure through holes or tears in the elastomer.

In the case of articles comprising metal wires embedded in a vulcanized elastomeric matrix, there still exists a great demand to satisfy two distinct requirements: (1) to ensure a good wire/vulcanized elastomeric matrix connection and (2) good corrosion resistance of the wire.

An apparently simple solution would be to coat the steel wires with a metal, such as, for example, zinc, which is capable of preventing corrosion. However, experiments carried out by the Applicants with mixtures which provide a good adhesion, as in the case of brass-coated steel cords, have proven to exhibit unsatisfactory results on galvanized steel cords.

The Applicants have therefore carried out other experiments raising the concentrations of the components capable of promoting good adhesion between the elastomer with brass-coated cords. More particularly the following have been used:

- a high concentration of cobalt (about 0.5–1%, as metallic cobalt) by weight with respect to the weight of elastomer in the mixture;
- high concentrations of resins that form in the mixture during vulcanization by resorcinol reaction in the presence of donors of methylene groups (resorcinol concentration in the mixture before vulcanization=about 4–10% by weight with respect to the weight of elastomer in the mixture); and/or
- a high concentration of sulphur (at least about 6% by weight with respect to the weight of elastomer in the mixture);

In all cases articles have been obtained whose features are on the whole inferior to those of the brass-coated cord/conventional mixture articles.

In fact, the mixtures with high cobalt concentrations provide connections with limited resistance to overvulcanization and to aging at high temperatures; mixtures with high resin concentrations pose environmental problems (generation of fumes) and connections with slight resistance to aging; mixtures with high sulfur concentrations make processing difficult and have limited resistance to aging.

The Applicants have therefore experimented with the behavior of products known for their capacity to facilitate adhesion between elastomers and metal surfaces such as, for example, the mercaptotriazines.

But even these substances, on the other hand, have not given satisfactory results with conventional galvanized steel/elastomeric matrices cords or for brass-coated steel cords.

But it has unexpectedly been found that there is a considerable synergy of action between cobalt and trimercaptotriazine such as to promote the maintenance of good connection levels even after aging and in the presence of humidity between elastomers and galvanized steel wires.

BRIEF SUMMARY OF THE INVENTION

The object of the present invention is thus to prepare an article comprising at least one metal wire embedded in a vulcanized elastomeric matrix obtained from a mixture comprising at least one vulcanizable elastomer and at least one vulcanization agent such as elemental sulfur characterized in that the metal wire is of galvanized steel and in that the vulcanizable mixture comprises at least 0.2% by weight, of 2,4,6-trimercapto-1,3,5-triazine, with respect to the weight of said elastomer and from 0.1 to 0.5% by weight of cobalt containing material, with respect to the weight of said elastomer.

DETAILED DESCRIPTION OF THE INVENTION

The vulcanized article can be composed of either natural or synthetic rubbers or mixtures thereof.

The thickness of the zinc coating layer of the galvanized steel wire ranges preferably from 0.15 to 0.35 microns.

Concentrations of trimercaptotriazine ranging from about 0.2 to 3% are generally sufficient to obtain the desired result.

Preferably, the cobalt containing material is added to the vulcanizable mixture in the form of a salt of bivalent cobalt. Even more preferable is a salt of the bivalent cobalt that has a high solubility in the elastomer. Typical examples of suitable cobalt salts according to the present invention are the boric salt marketed by Manchem under the name MANOBOND 680 having the following formula;

$$X-Co-O-B\begin{matrix}O-Co-X\\ \\O-Co-X\end{matrix}$$

wherein X may be the same or different and is selected form the group consisting of:

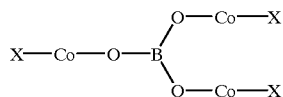

and the neodecanoate bivalent cobalt salt of the Goldschmidt and Manchem firms having the following formula Y—Co—Y wherein Y, which may be the same or different, is selected from the group consisting of:

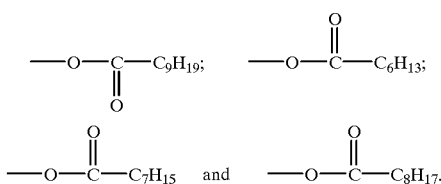

The preferred concentrations of bivalent metallic cobalt range from about 0.1 to 0.3% by weight, with respect to the weight of said elastomer.

Further objects of the present invention relate to producing tires, conveyor belts, transmission belts and flexible hose which comprise at least one reinforcing structure produced with an article of the present invention.

The examples and the tests given below are given purely as a non-limiting illustration.

Figure 1:
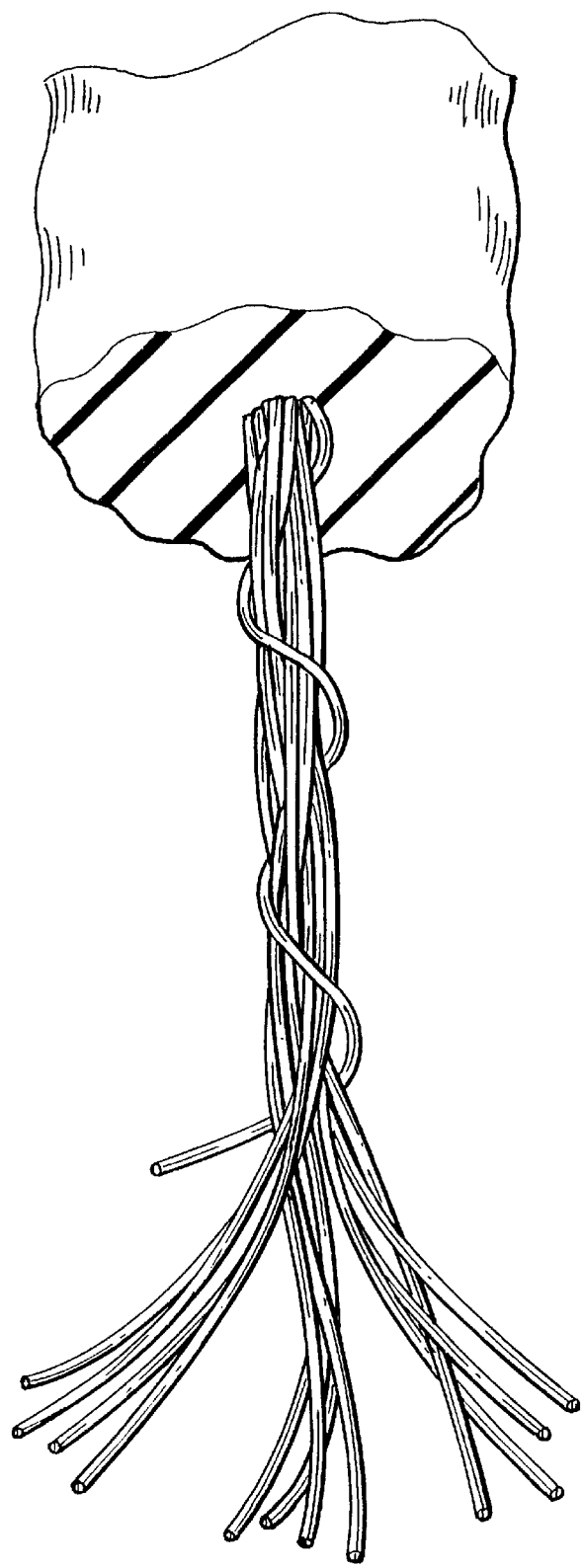
FIG. 1 shows a chord embedded in vulcanized elastomers.

In the examples and tests, the letters 74175WLL identify the form of a cord commonly used in reinforcing structures of jumbo radial tires which is represented by the structure of FIG. 1.

The cord is composed of 7 strands, each of the 7 strands is composed of 4 galvanized steel wires having a diameter of 0.175 mm which wires are wound with a wrapper wire having a diameter of 0.15 mm. A cord of the equal sense type (that is, the direction of the winding of the wires in each strand and the direction of the winding of the strands in the cord is always the same) is produced. Obviously, the cord used in the examples is formed of wires of galvanized steel while those commonly used in tires are of brass-coated steel.

Other abbreviations and terms used in the examples have the following meaning:

NR=natural rubber,
C.B.=carbon black,
HMMM=hexamethoxymethylmelamine,
Accelerator=dicyclohexylbenzothiazolsulphenamide,
ZF=trimercaptotriazine.

Lastly, the quantities of the component of the vulcanizable mixtures exemplified are expressed in parts by weight.

EXAMPLES 1–7

Samples have been prepared by embedding 74175WLL steel cords coated with a zinc layer of 0.24 (Samples 024) and 0.29 (Samples 029) microns in mixtures having the compositions indicated below and vulcanizing the mixtures at 151° C. for 40 minutes.

| Ingre- | Mixture | | | | | | |
|---|---|---|---|---|---|---|---|
| dients | K' | K" | K'" | A | B | C | D |
| NR | 100 | 100 | 100 | 100 | 100 | 100 | 100 |
| ZnO | 8 | 8 | 8 | 8 | 8 | 8 | 8 |
| CoII | = | 0.24 a) | = | 0.24 a | 0.24 b | 0.20 c | 0.20 d |
| C.B. | 55 | 50 | 55 | 50 | 60 | 50 | 50 |
| $SiO_2$ | = | = | = | = | 7 | 10 | 10 |
| Resorcinol | 2 | 2 | 2 | 2 | 2 | 3 d | 3 d |
| HMMM | 2.4 | 2.4 | 2.4 | 2.4 | 2.4 | 2.4 | 2.4 |
| Accelerator | 1.2 | 1.2 | 1.2 | 1.0 | 1.2 | 1.1 | 1.2 |
| Sulphur | 4 | 4 | 4 | 6 | 6 | 4 | 3 |
| ZF | = | = | 1 | 1 | 1 | 0.5 | 1.5 | a) = equal to 1.2 g of MANOBOND 680C bivalent cobalt salt
b) = equal to 1.2 g of Neodecanoate
c) = equal to 1.0 g of MANOBOND 680C bivalent cobalt salt
d) = pre-condensed Resorcinol (PENACOLITE)

TESTS

I. Measurement of the Elastomer/Metal Adhesion

The determination has been made with a method which measures the force necessary to withdraw a cord from a cylinder of vulcanized rubber, described in Kautschuk and Gummi Kunstoffe vol. 5 228–232 (1969) incorporated herein by reference. The Samples 024 and 029 had been prepared by vulcanizing the mixtures from K' to D as indicated in the previous Examples 1–7.

The withdrawal load has been measured with an electronic dynamometer.

The degree of coating of the cord extracted from the sample, expressed by means of a coating index, assesses the percentage of the surface of the cord which is still well coated with rubber. When the value of the coating index is high, the separation between cord and mixture has taken place due to a defect of cohesion of the mixture and not due to a defect of adhesion of the mixture/metal interface.

CSF indicates the value of the withdrawal load in Newtons; on a sample having an embedded length equal to 20 mm; GC, on the other hand, indicates the value of the coating index.

The initial values and those observed after keeping them in a climate control room at 65° C./90% relative humidity for 8 and 16 days are given below:

SAMPLES 024

| Type of mixture | | | | | | | | |
|---|---|---|---|---|---|---|---|---|
| | A | | B | | C | | D | |
| | CSF | GC | CSF | GC | CSF | GC | CSF | GC |
| Initial | 1175 | 4 | 1300 | 4 | 1350 | 4 | 1140 | 4 |
| After 8 days | 1130 | 4 | 1050 | 4 | 970 | 2 | 860 | 2 |
| After 16 days | 750 | 4 | 870 | 4 | 560 | 1 | 880 | 2 |
| | K' | | K" | | K"' | | | |
| | CSF | GC | CSF | GC | CSF | GC | | |
| Initial | 105 | 1 | 111 | 1 | 1160 | 3 | | |
| After 8 days | — | — | — | — | 90 | 1 | | |
| After 16 days | — | — | — | — | 105 | 1 | | |

SAMPLES 029

| Type of mixture | | | | | | | | |
|---|---|---|---|---|---|---|---|---|
| | A | | B | | C | | D | |
| | CSF | GC | CSF | GC | CSF | GC | CSF | GC |
| Initial | 1230 | 4 | 1300 | 4 | 1300 | 4 | 1125 | 4 |
| After 8 days | 1100 | 4 | 1070 | 4 | 1020 | 3 | 840 | 2 |
| After 16 days | 865 | 4 | 920 | 4 | 695 | 2 | 720 | 2 |
| | K' | | K" | | K"' | | | |
| | CSF | GC | CSF | GC | CSF | GC | | |
| Initial | 100 | 1 | 116 | 1 | 1176 | 3 | | |
| After 8 days | — | — | — | — | 103 | 1 | | |
| After 16 days | — | — | — | — | 123 | 1 | | |

II. Measurement of Resistance to Corrosion

The resistance of the wire to corrosion has been assessed by the measurement of the breaking load (CR) of the wire before and after aging in a climate control room at 65° C./90% relative humidity for 15, 30 and 45 days.

The tests have been conducted on steel wires having a diameter of 0.175 mm coated with various thicknesses of zinc (0.17, 0.24, 0.29 microns) compared with a steel wire of the same diameter, coated with 0.29 microns of brass.

The results obtained are indicated below:

| | Galvanized wire | | | Brassed wire |
|---|---|---|---|---|
| CR | 0.17 | 0.24 | 0.29 | 0.29 |
| Initial | 100 | 100 | 100 | 100 |
| After 15 days | 95 | 100 | 94 | 64 |
| After 30 days | 90 | 94 | 96 | 61 |
| After 45 days | 95 | 99 | 97 | 60 |

Figure 2:
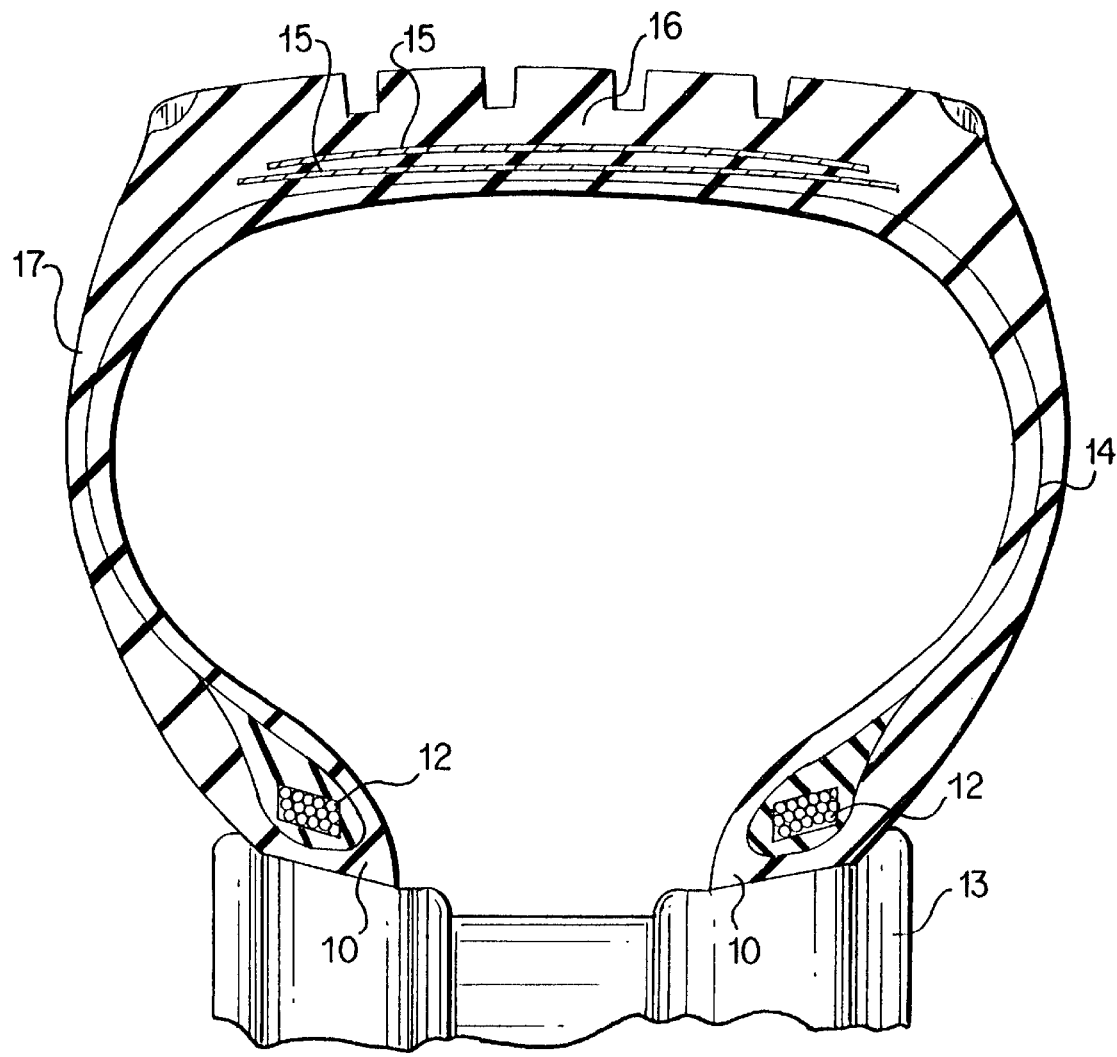
FIG. 2 is a sectional view of a tire produced in accordance with the invention.

FIG. 2 shows a tire produced in a known manner but employing the vulcanization mixture of the invention. The tire is mounted on rim 13, and is composed of a bead 10, bead core 12, carcass ply 14, belts 15, tread 16 and side wall 17. The belts 15 are composed of galvanized steel wire cords, and the tire is produced from vulcanizable mixture containing a trimercaptotriazine and a cobalt-containing material.

Figure 3:
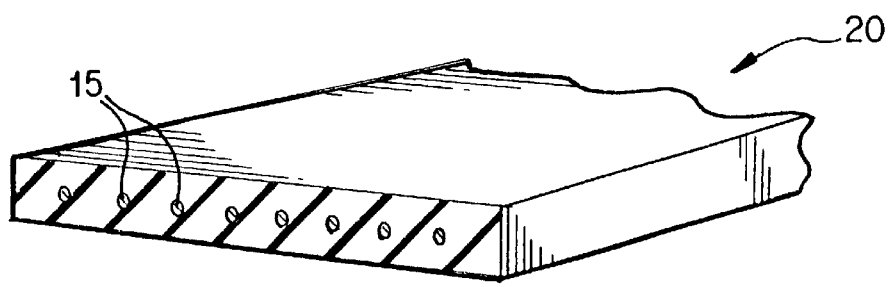
FIG. 3 is a perspective view in section of a conveyor belt produced in accordance with the invention.
Figure 4:
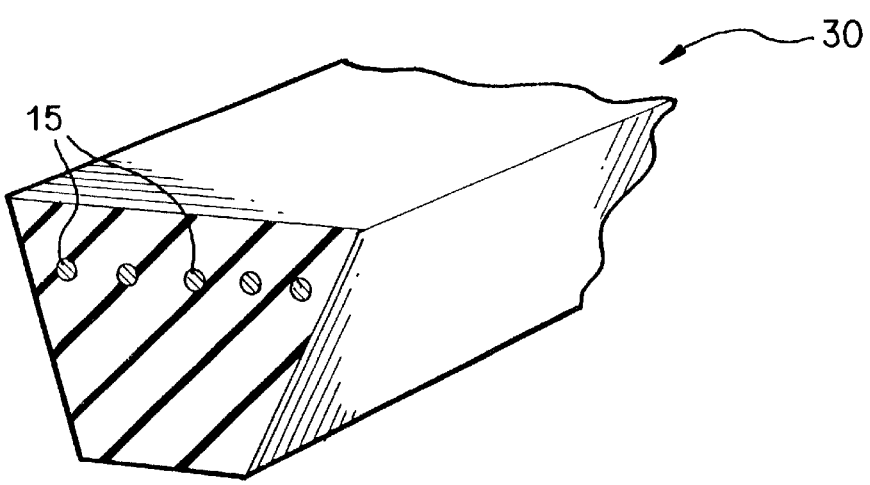
FIG. 4 is a perspective view in section of a transmission belt produced in accordance with the invention.
Figure 5:
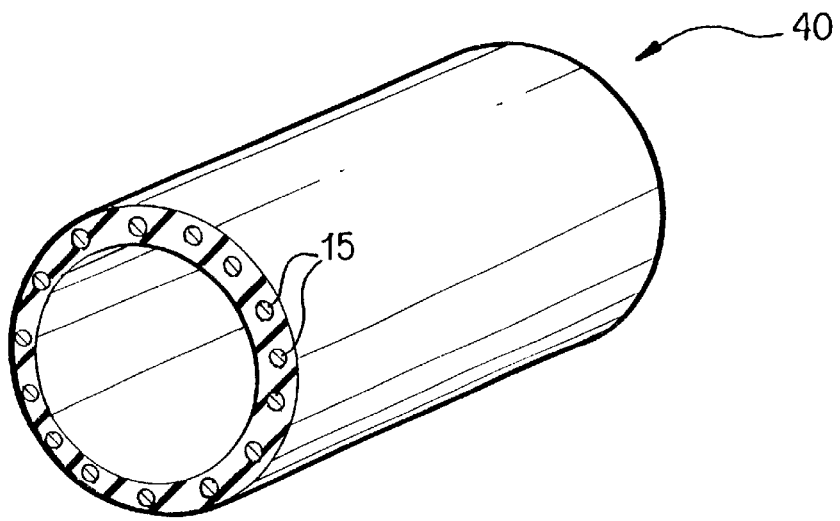
FIG. 5 is a perspective view in section of a flexible hose produced in accordance with the invention.

FIGS. 3 through 5 show a conveyer belt 20, a transmission belt 30 and a rubber hose 40, respectively, each of which is reinforced with galvanized steel wire cords 15. The articles are produced from vulcanizable mixtures containing trimercaptotriazine and a cobalt-containing material. The vulcanizable mixture of the invention synergistically provides greater adhesion between galvanized metal wires and vulcanized elastomer than conventional vulcanizable mixtures.

What is claimed is:

1. A method for increasing cohesion between a vulcanized elastomer and at least one galvanized steel wire embedded in the vulcanized elastomer, comprising:

including at least one galvanized steel wire in a mixture comprising at least one vulcanizable elastomer, at least one vulcanization agent, at least 0.2% by weight of trimercaptotriazine with respect to the weight of said elastomer and from 0.1 to 0.5% by weight of cobalt containing material with respect to the weight of said elastomer; and vulcanizing the mixture.

2. The method of claim 1 wherein the concentration of the trimercapto triazine is about 0.2 to 3% by weight.

3. The method of claim 1 wherein cobalt containing material is in the form of a cobalt salt.

4. The method of claim 3 wherein the cobalt salt is soluble in the elastomer.

5. The method of claim 4 wherein the cobalt is either a)

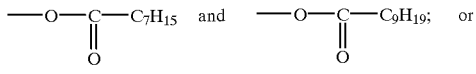

wherein X, which may be the same or different, is selected from the group consisting of:

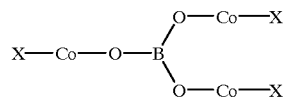

b)

wherein Y, which may be the same or different, is selected from the groups consisting of:

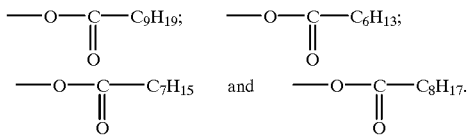

* * * * *